(12) United States Patent
Wu

(10) Patent No.: US 10,762,916 B1
(45) Date of Patent: Sep. 1, 2020

(54) SHARED MAMR AND HDI SENSOR/DRIVER

(71) Applicant: Headway Technologies, Inc., Milpitas, CA (US)

(72) Inventor: Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/292,451

(22) Filed: Mar. 5, 2019

(51) Int. Cl.
| | |
|---|---|
| G11B 5/012 | (2006.01) |
| G11B 5/127 | (2006.01) |
| G11B 5/235 | (2006.01) |
| G11B 5/31 | (2006.01) |
| G11B 5/60 | (2006.01) |
| G11B 5/00 | (2006.01) |

(52) U.S. Cl.
CPC ............ *G11B 5/1278* (2013.01); *G11B 5/012* (2013.01); *G11B 5/235* (2013.01); *G11B 5/3146* (2013.01); *G11B 5/6076* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 6,785,092 | B2 | 8/2004 | Covington et al. |
| 7,312,941 | B2 | 12/2007 | Hirano et al. |
| 7,589,600 | B2 | 9/2009 | Dimitrov et al. |
| 7,957,098 | B2 | 6/2011 | Yamada et al. |
| 8,139,322 | B2 | 3/2012 | Yamada et al. |
| 8,320,079 | B2 | 11/2012 | Iwaski et al. |
| 8,885,274 | B1 * | 11/2014 | Furukawa et al. ........... G11B 20/10305 360/31 |
| 9,343,082 | B2 | 5/2016 | Burger et al. |
| 9,390,733 | B2 | 7/2016 | Etoh et al. |
| 2005/0057833 | A1 | 3/2005 | Hirano et al. |
| 2009/0080106 | A1 | 3/2009 | Shimizu et al. |
| 2013/0188273 | A1 * | 7/2013 | Miyamoto et al. .. G11B 5/6076 360/59 |
| 2013/0335847 | A1 | 12/2013 | Shiroishi |
| 2014/0347969 | A1 * | 11/2014 | Nishida et al. ...... G11B 5/6076 360/234.4 |
| 2016/0218728 | A1 | 7/2016 | Zhu |
| 2018/0075868 | A1 | 3/2018 | Koui et al. |

* cited by examiner

*Primary Examiner* — Craig A. Renner
(74) *Attorney, Agent, or Firm* — Saile Ackerman LLC; Stephen B. Ackerman; Billy Knowles

(57) ABSTRACT

A disk drive head assembly includes a spin torque oscillator (STO) situated between a main pole and a trailing shield. A head-disk interference (HDI) sensor is placed between the main pole and a read sensor shield. A trace is connected between a preamplifier and the head assembly for providing a first biasing voltage level to the spin torque oscillator (STO) and to the head-disk interference (HDI) sensor for determining resistance changes in the head-disk interference (HDI) sensor. Further, the preamplifier is configured for determining a resistance change in the head-disk interference (HDI) sensor based on a change in current through the head-disk interference (HDI) sensor. The spin torque oscillator (STO) and the head-disk interference (HDI) sensor are connected in parallel to two connectors from the two contacting pads on the preamplifier.

24 Claims, 4 Drawing Sheets

SHARED MAMR AND HDI SENSOR/DRIVER

TECHNICAL FIELD

This disclosure relates generally to a microwave assisted magnetic recording (MAMR) device with a spin torque oscillator (STO) connected in parallel with a head-disk interference (HDI) sensor incorporated in a magnetic recording head, that are usually built into a head gimbal assembly, and then further into head stack assembly used in a hard disk drive.

BACKGROUND

As is known in the art, microwave assisted magnetic recording (MAMR) is a recording method to improve the areal density of a magnetic read/write head for use in a hard disk drive (HDD). MAMR enabled magnetic recording head utilizes a spin torque oscillator (STO) for generating a magnetic field having a microwave frequency. When the magnetic field from the write head is applied and current is conducted through the STO, the STO oscillates and the field is transferred to the medium. The AC magnetic field reduces the coercive force of the recording medium, thus high quality recording by MAMR may be achieved.

In hard disk drives, the read/write heads are flying closer and closer to the disk, and it is increasingly important to precisely detect the flying height and head disk impact. To do this, mechanical vibration of the read/write head is usually used to detect contact between the read/write head and the disk, because contact awareness is important to accurate flying height spacing. A dedicated contact sensor provides more accurate contact detection. The contact sensor is commonly referred to as a head-disk interference sensor (HDI). Some head-disk interference sensors are resistive temperature detectors that are configured into the head slider. The temperature change of the HDI sensor is used to indicate contact or the relative flying height of the slider. The HDI sensor has a current flowing through it for putting the sensor at a higher temperature than the local environment and providing a mean for monitoring its resistance change.

Both the STO and the HDI sensor require an additional electrical trace connection from the preamplifier to the head slider. Additionally, electrical connection pads are needed on the slider to accommodate both the STO and the HDI sensor.

SUMMARY

An object of this disclosure is to provide a read/write head on an arm-head assembly that includes a spin torque oscillator (STO) and a head-disk interference (HDI) sensor connected in parallel.

To accomplish at least this object, a hard disk drive has a head-gimbal assembly that is configured with an STO situated between a main pole and a trailing shield. An HDI sensor is placed in the vicinity of the main pole and one of the magneto-resistive shields of the magneto-resistive read sensor. A conductive trace is connected between a pad on the preamplifier affixed to the head stack assembly. The preamplifier is configured for providing a first biasing voltage level to the spin torque oscillator (STO) and to the HDI sensor for determining resistance changes in the head-disk interference (HDI) sensor. Further, the preamplifier is configured for determining a resistance change in the HDI sensor based on a change in current through the HDI sensor.

The STO and the HDI sensor are connected to a first connector of the trace such that a first terminal of the STO and the HDI sensor receive a first polarity of the first biasing voltage and connected to a second connector of a second trace such that a second terminal of the STO and the HDI sensor receive a second polarity of the first biasing voltage.

In another embodiment, the first terminal of the HDI sensor is connected to a first terminal of a first resistor. A second terminal of the first resistor is connected to the first connector of the trace. A second terminal of the HDI sensor is connected to a first terminal of a second resistor. A second terminal of the second resistor is connected to the second connector of the trace.

In some embodiments, the first terminal of the STO is connected to a first terminal of a third resistor. A second terminal of the third resistor is connected to the first connector of the trace. A second terminal of the STO is connected to a first terminal of a fourth resistor. A second terminal of the fourth resistor is connected to the second connector of the trace.

In some embodiments, a first terminal of a fifth resistor is connected to the second terminals of the first and third resistors and the first connector of the trace. A first terminal of a sixth resistor is connected to the second terminals of the second and fourth resistors and the second connector of the trace. The second terminals of the fifth and sixth resistors are connected to a ground reference terminal. The first, second, third, and fourth, fifth, and sixth resistors are selected to balance out the bias voltage requirements of the STO and the HDI sensor and deliver the desired voltage to the STO and the HDI sensor.

In various embodiments, the first, second, third, and fourth, fifth, and sixth resistors are selectively placed inside the head device or on the preamplifier or a hard disk controller circuit. In embodiments, the first and second terminals of the STO and the HDI sensor are connected to individual connectors of the trace and thus to the resistors as described above.

DETAILED DESCRIPTION

Figure 1:
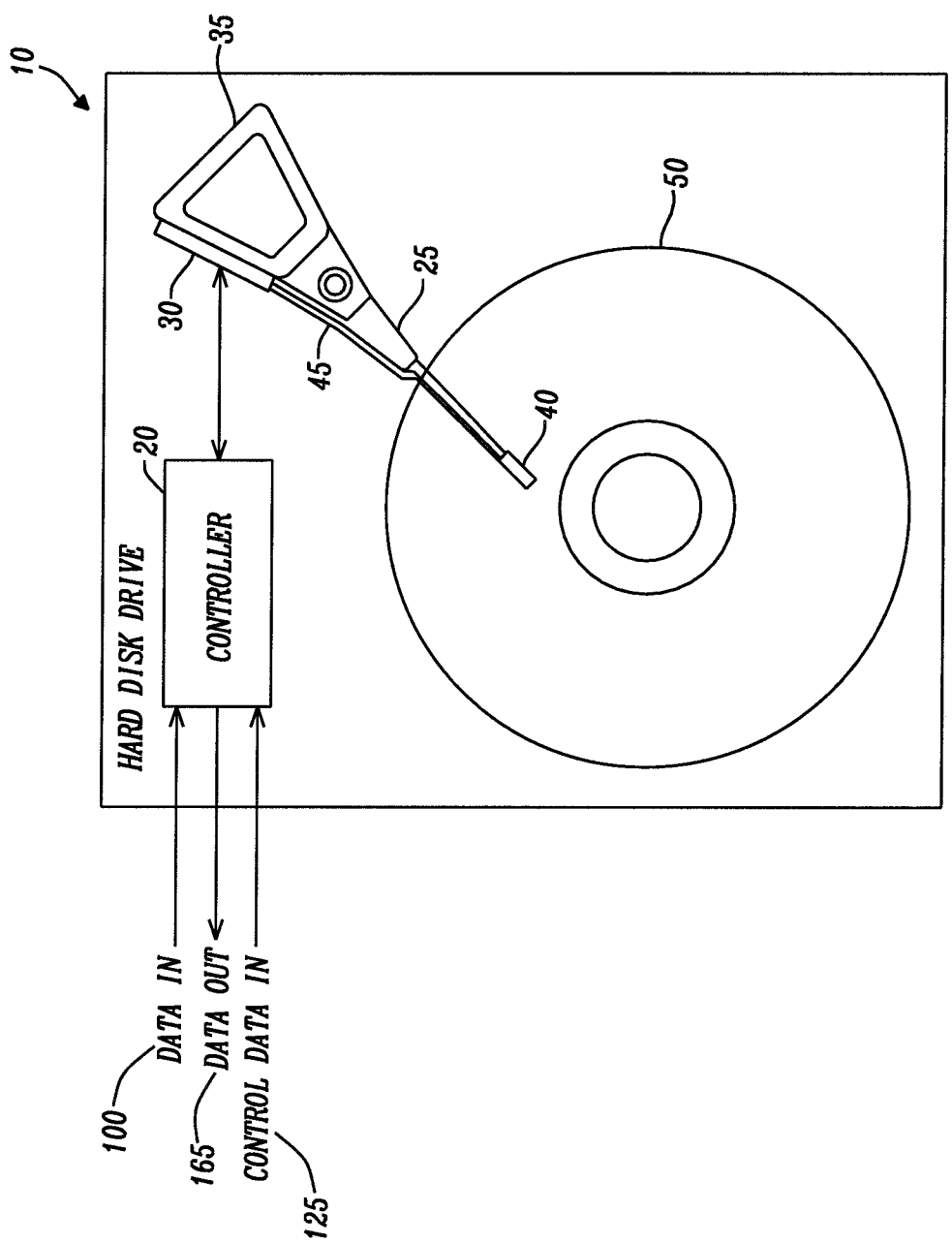
FIG. 1 is a representation of a magnetic hard disk drive embodying the principles of the present disclosure.

FIG. 1 is a representation of a magnetic hard disk drive 10 embodying the principles of the present disclosure. Data from an external device is applied to the magnetic hard disk drive 10 through the data input terminal 100. Data to be transferred to the external device is transferred from the magnetic disk drive 10 through the data output terminal 165.

The data input signal 100 is applied to the disk controller 20. The disk controller 20 formats the data input signal to set the conditions suitable for writing the magnetic disk 50. The formatted data input is transferred to the preamplifier for conversion to the head current used to generate the magnetic field for writing the magnetic disk.

Further, the controller 20 receives the data read from the magnetic disk 50 through the preamplifier 30. The preamplifier 30 and the controller 20 condition the signals read from the magnetic disk 50 to decode the output data. The output data is transferred through the terminal 165 to the external device. Control data is applied to the controller 20 through the terminal 125 for communicating control information such as data request, I/O read/write, channel ready, address, data acknowledge, etc.

A head arm or head stack assembly 25 has the magnetic read/write head 40 mounted at a distal end of the arm-head assembly 25. A voice coil 35 is mounted at an opposite end of the head arm or head stack assembly 25. The voice coil 35 receives control signals from the controller 20 for causing the magnetic read/write head assembly 40 to move across the disk 50. The magnetic read/write head 40 is then able to read from and record to the disk 50.

The preamplifier 30 is mounted on the head arm assembly 25. A trace 45 is connected from the preamplifier 30 to the magnetic read/write head 40 to transfer the data and control signals between the preamplifier 30 and the magnetic read/write head 40. The trace 45 is also secured to the head arm assembly 25.

Figure 2:
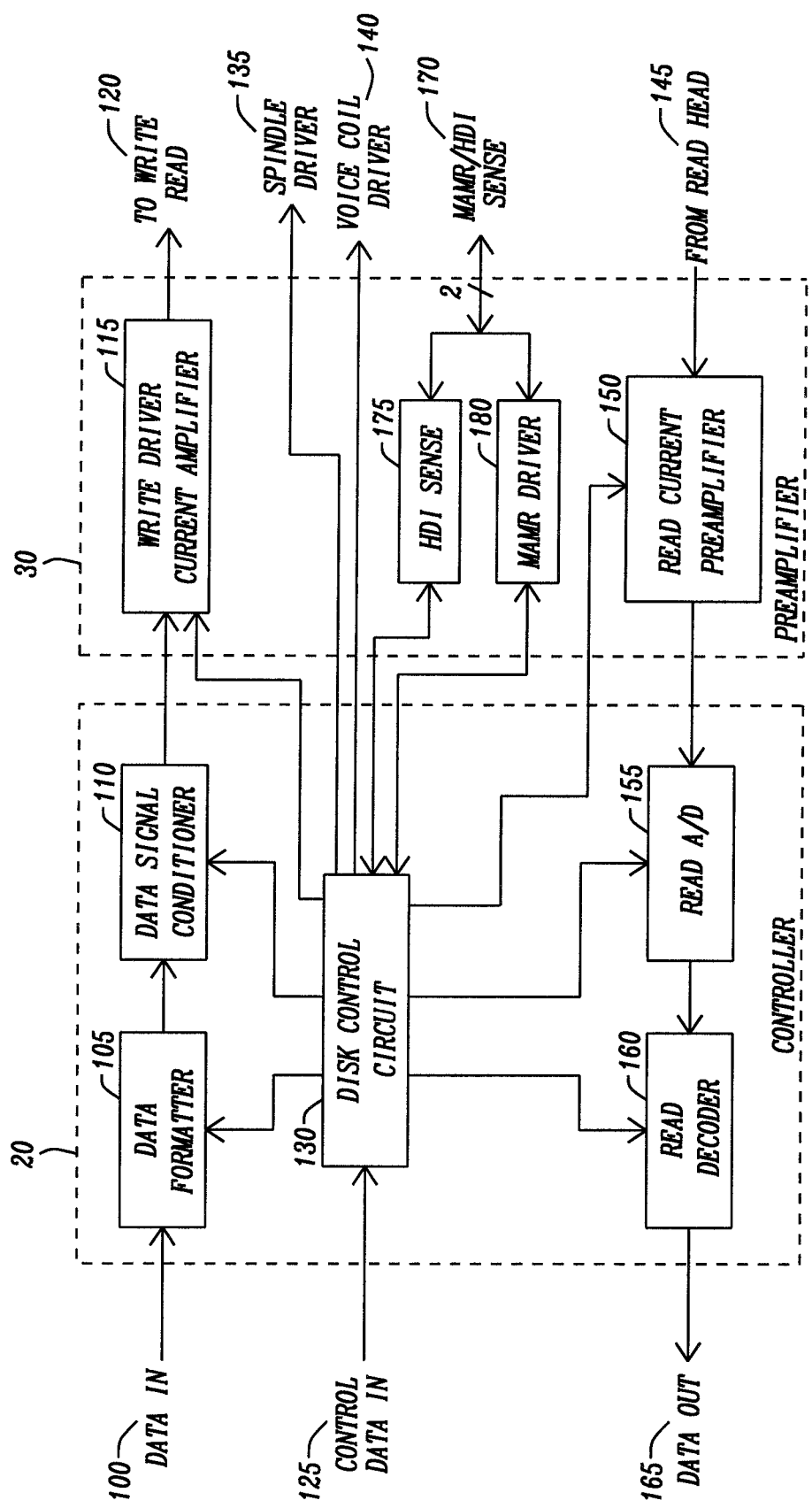
FIG. 2 is a block diagram of a controller and preamplifier embodying the principles of the present disclosure.

FIG. 2 is a block diagram of a controller 20 and preamplifier 30 embodying the principles of the present disclosure. The input data received through the terminal 100 is applied to a data formatter circuit 105 for encoding the data to a format acceptable to the hard disk media for writing the data to the hard disk. The encoded data is then transferred to a data conditioner circuit 110 to have conditioning such as precompensation or other adjustments to accommodate the transmission line characteristics of the trace 45 of FIG. 1. The conditioned data is transferred to the write driver current amplifier 115 for transformation to a current for transmission to the write head 120.

The write control data transferred through the terminal 125 is received by the disk controller circuit 130 for supervising the encoding, decoding, synchronization control of the hard disk drive 10 of FIG. 1. The disk control circuit 130 provides a spindle motor driver control signal 135 for turning on a spindle motor for spinning the disk 50 of FIG. 1. The disk control circuit 130 also provides a voice coil motor driver control signal 140 for actuating the voice coil to move the arm-head assembly over the surface of the disk 50 of FIG. 1.

Read data sensed by the read head 145 is transferred to the read current preamplifier 150, where the signals are amplified and transmitted to the read analog to digital (A/D) converter 155 where the data voltage signals are converted to a sequence of digital numbers. The converted digital data are transferred to the read decoder 160 for converting the digital read data to the decoded read data. The read output data from the read decoder 160 is transferred to the external device.

Figure 3:
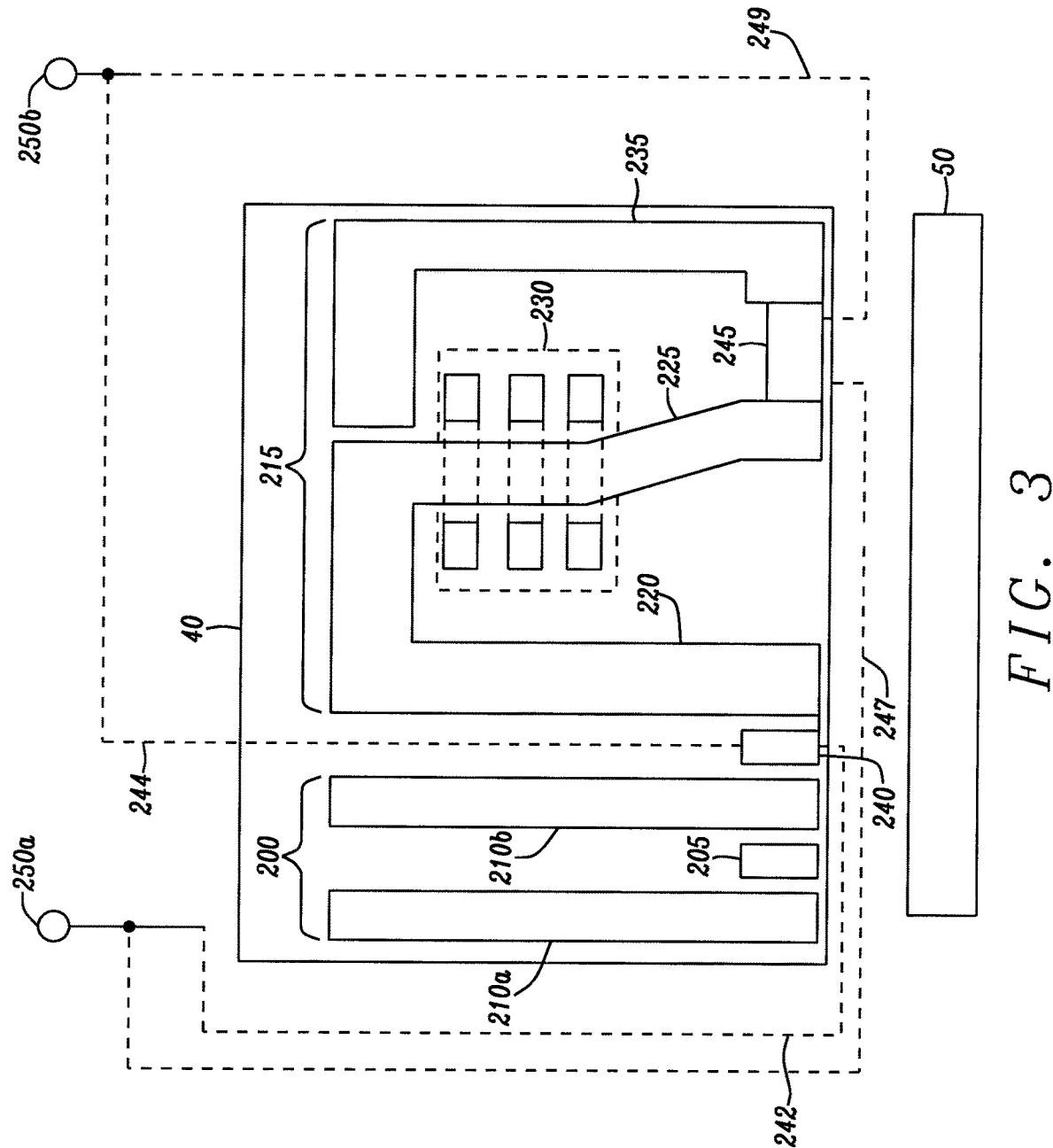
FIG. 3 is a block diagram of a magnetic head assembly embodying the principles of the present disclosure.

FIG. 3 is a block diagram of a magnetic read/write head assembly 40 embodying the principles of the present disclosure. The read head 200 is typically a tunneling magnetoresistive (TMR) device that detects the magnetic field of the stored data on the magnetic disk 50. The sensed signal of the stored data as detected by the read sensor 205 is transferred to the preamplifier 30 by the trace 45 that is connected to the magnetic read/write head 40 and the preamplifier 30 of FIG. 1. The preamplifier 30 amplifies the signal sensed by the magnetic read/write head 40 from the data location of the magnetic disk 50 for transfer to the read A/D converter 155 of the controller 20 of FIG. 2. Adjacent to the read sensor 205 are two magnetic read shields 210*a* and 210*b*. The magnetic read shields 210*a* and 210*b* isolate the read sensor 205 from stray magnetic fields that may corrupt the read data.

The write head 215 generates the magnetic field that switches the magnetic domains at the data locations on the magnetic disk 50. The write head 215 has a return pole 220 and a main pole 225 that form the magnetic circuit with the magnetic media of the magnetic disk 50. The magnetic field is generated at the tip of the main pole 225. The coil 230 is wound around the main pole 225. A current is passed through the coil 230 to induce a magnetic field in the gap between the main pole 225 and the return pole 220, also some leakage field near the gap and thus in the magnetic media of the magnetic disk 50.

An HDI sensor 240 is normally placed between the read head 200 and element write head 215. The HDI sensor 240 is a resistive element such as a physical resistor or a spin torque device placed at the slider surface of the magnetic read/write head 40 to detect the separation and/or contact of the write head assembly 40 from the disk 50. The resistance of the HDI sensor 240 will decrease as the HDI sensor 240 moves closer to the disk 50 as a result of more effective cooling. The resistance of the HDI sensor 240 will increase when the HDI sensor 240 hits the disk due to heat generation from friction of magnetic read/write head 40 dragging on the disk 50. The HDI sensor 240 has a pair of wiring traces 242 and 244 that are connected respectively to the connectors 250*a* and 250*b* that are part of the connector of the trace 45 of FIG. 4.

An STO 245 is placed between the main pole 225 and the trailing shield 235. The STO 245 has wiring traces 247 and 249 that are connected respectively to the connectors 250*a* and 250*b*, thus making the STO 245 in parallel to the HDI sensor 240.

The STO 245 consists of a magnetic layer that serves as a polarizer, a non-magnetic spacer, and a magnetic "free" layer. A DC biasing voltage is applied across the STO 245 that is large enough to transfer a sufficient magnitude of spin torque to the free layer to cause its magnetic moment to precess around the gap field direction. The precession frequency is usually in the microwave frequency range. This STO 245 generates an AC microwave magnetic field that travels to the disk 50 to assist the switching of the magnetic domain in the region of the disk 50 beneath the STO 245. This allows more data to be written to the disk for a given area.

Referring back to FIGS. 2 and 3, the parallel connections of the HDI sensor 240 and the STO 245 feed through the trace 45 to the preamplifier 30. The disk control circuit 130 is connected to the microwave assisted magnetic recording (MAMR) driver 180 to activate a biasing voltage source that transfers a biasing MAMR voltage through one of the two (2) connections 170 to the trace 45 and thus to the STO 245 for activating the microwave radiation of the STO 245. The current resulting from the biasing voltage flows through the HDI sensor 240 for determining the resistance of the HDI sensor 240. The biasing voltage is adjusted to allow the control of the MAMR driver 180 and HDI sensor 240 performance. The HDI sense circuit 175 is connected from the trace 45 through the second of the two (2) connections 170 for detecting the relatively low frequency (<1 MHz) changes in the current flowing through the HDI sensor 240 that results from the changes in the resistance of the HDI sensor 240 as the magnetic read/write head 40 fluctuates in spacing above the disk 50 as the disk rotates. The sense signal from the HDI sense circuit 175 is transferred to the disk control circuit 130 for determining if the magnetic read/write head 40 is flying too close to the disk and/or if any contact has occurred. This information is used to control the spacing between the head 40 and disk 50 either with or without active feedback.

Figure 4:
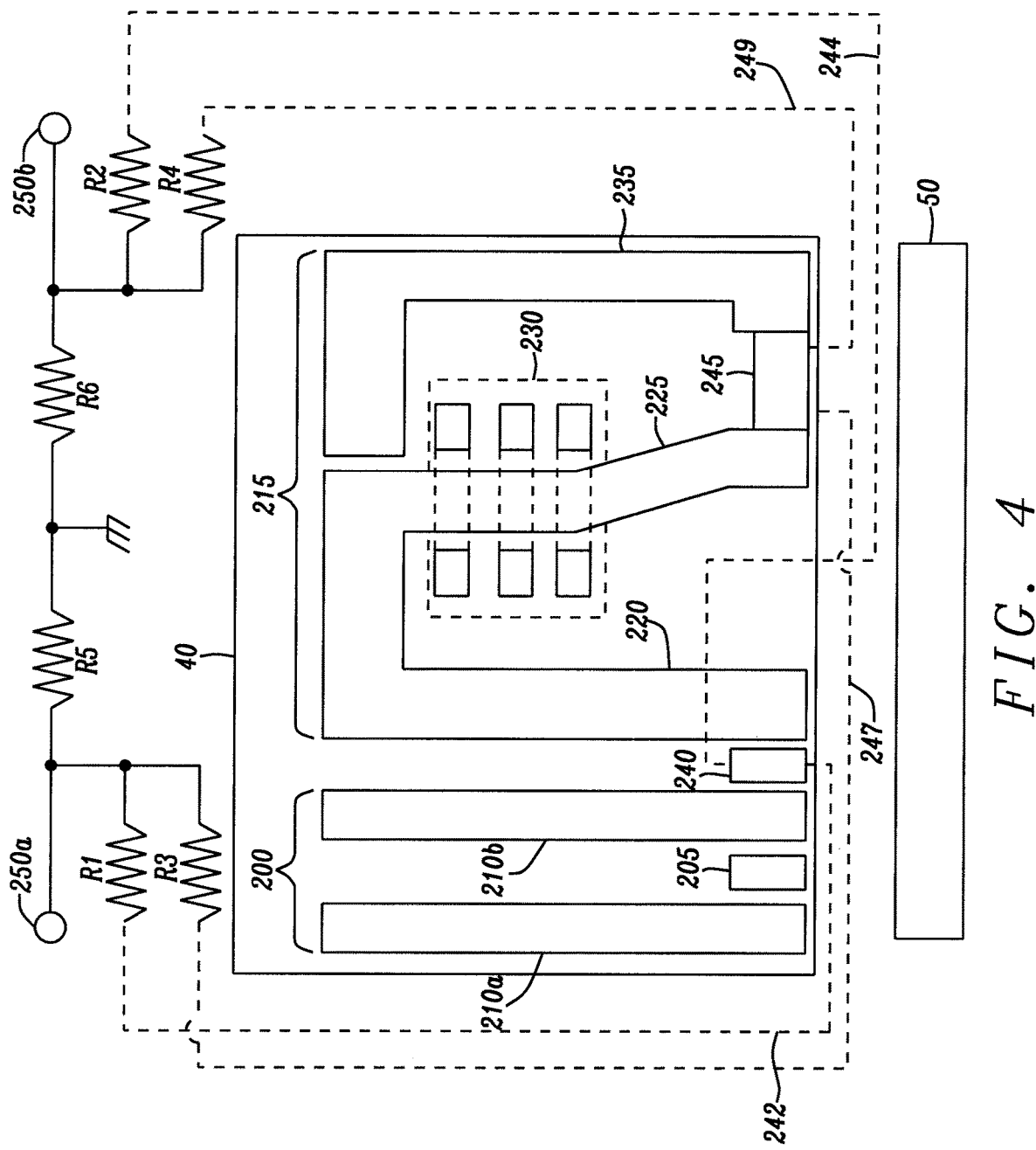
FIG. 4 is a block diagram of a magnetic head assembly showing biasing voltage balancing that embodies the principles of the present disclosure.

FIG. 4 is a block diagram of a magnetic head assembly showing biasing voltage balancing that embodies the principles of the present disclosure. FIG. 4 is identical to FIG. 3 in terms of structure and function of the magnetic read/write head assembly 40. The difference being in the addition of the resistors R1, R2, R3, R4, R5, and R6. Resistor R1 has a first connection that is connected through the wiring trace 242 to the first terminal of the HDI sense circuit 175. The second terminal of the resistor R1 is connected to the first connector 250*a* of the trace 45. Resistor R2 has a first connection that is connected through the wiring trace 244 to the first terminal of the HDI sense circuit 175. The second terminal of the resistor R2 is connected to the second connector 250*b* of the trace 45.

Resistor R3 has a first connection that is connected through the wiring trace 247 to the first terminal of the STO 245. The second terminal of the resistor R3 is connected to the first connector 250*b* of the trace 45. Resistor R4 has a first connection that is connected through the wiring trace 249 to the second terminal of the STO 245. The second terminal of the resistor R4 is connected to the second connector 250*b* of the trace 45. The connections as described place the HDI sensor 240 and the STO 245 in parallel with the HDI sense circuit 175 and the microwave assisted magnetic recording (MAMR) driver 180 of FIG. 2 functioning as described above.

The first terminal of the resistor R5 is connected to the second terminals of the resistors R1 and R3. The first terminal of the resistor R6 is connected to the second terminals of the resistors R2 and R4. The second terminals of the resistors R5 and R6 are connected to a ground reference terminal of the trace 45 or to the structure of the head arm assembly 25. The resistances of the resistors R1, R2, R3, R4, R5, and R6 are adjusted such that the biasing voltage across the microwave assisted magnetic recording (MAMR) STO sensor 245 and the bias voltage on the HDI sensor are both at the desired level for a certain output from the preamp.

While this disclosure has been particularly shown and described with reference to the preferred embodiments thereof, it will be understood by those skilled in the art that various changes in form and details may be made without departing from the spirit and scope of the disclosure.

What is claimed is:

1. A read/write head assembly comprising:
   a read head comprising:
      a read sensor, and
      a pair of magnetic read shields;
   a write head comprising:
      a main pole, and
      a trailing shield adjacent to the main pole;
   a spin torque oscillator (STO) situated between the main pole and the trailing shield and connected to a voltage for developing a current that flows through the spin torque oscillator (STO); and
   a head-disk interference (HDI) sensor between the trailing shield and one of the magnetic read shields and connected to a trace coupling a preamplifier and the read and write heads, wherein the preamplifier is configured for providing a first biasing voltage level to the spin torque oscillator (STO) and simultaneously to the head-disk interference (HDI) sensor to determine resistance changes in the head-disk interference (HDI) sensor;
   wherein the spin torque oscillator (STO) and the head-disk interference (HDI) sensor are coupled to a first connector of the trace such that a first terminal of the spin torque oscillator (STO) and the head-disk interference (HDI) sensor receive a first polarity of the first biasing voltage level and coupled to a second connector of the trace such that a second terminal of the spin torque oscillator (STO) and the head-disk interference (HDI) sensor receive a second polarity of the first biasing voltage level.

2. The read/write head assembly of claim 1 wherein the first terminal of the head-disk interference (HDI) sensor is connected to a first terminal of a first resistor and a second terminal of the first resistor is connected to the first connector of the trace, wherein the second terminal of the head-disk interference (HDI) sensor is connected to a first terminal of a second resistor and a second terminal of the second resistor is connected to the second connector of the trace.

3. The read/write head assembly of claim 2 wherein the first terminal of the spin torque oscillator (STO) is connected to a first terminal of a third resistor and a second terminal of the third resistor is connected to the first connector of the trace, wherein the second terminal of the spin torque oscillator (STO) is connected to a first terminal of a fourth resistor and a second terminal of the fourth resistor is connected to the second connector of the trace.

4. The read/write head assembly of claim 3 wherein a first terminal of a fifth resistor is connected to the second terminals of the first and third resistors and the first connector of the trace, a first terminal of a sixth resistor is connected to the second terminals of the second and fourth resistors and the second connector of the trace, and a second terminal of each of the fifth and sixth resistors are connected to a ground reference terminal.

5. The read/write head assembly of claim 4 wherein the first, second, third, fourth, fifth, and sixth resistors are selected to balance out bias voltage requirements of the spin torque oscillator (STO) and the head-disk interference (HDI) sensor and deliver a desired voltage to the spin torque oscillator (STO) and the head-disk interference (HDI) sensor.

6. The read/write head assembly of claim 1 wherein the first terminal of the spin torque oscillator (STO) and the first terminal of the head-disk interference (HDI) sensor are connected to the first connector of the trace and the second terminal of the spin torque oscillator (STO) and the second terminal of the head-disk interference (HDI) sensor are connected to the second connector of the trace to couple the spin torque oscillator (STO) and the head-disk interference (HDI) sensor in parallel.

7. An arm-head assembly within a hard disk drive, comprising:
   an arm assembly for moving a head assembly to designated locations over the hard disk;
   a preamplifier attached to the arm assembly and configured for amplifying and conditioning read and write data to be read from and written to the hard disk;
   the head assembly affixed to the arm assembly to be moved to the locations over the hard disk for reading data from and writing data to the hard disk, the head assembly comprising:
      a read head configured for reading data from the designated locations of the hard disk, comprising:
         a read sensor, and
         a pair of magnetic read shields;
      a write head comprising:
         a main pole;

a trailing shield adjacent to the main pole;
a spin torque oscillator (STO) situated between the main pole and the trailing shield and connected to a voltage for developing a current that flows through the spin torque oscillator (STO); and
a head-disk interference (HDI) sensor placed between the trailing shield and one of the magnetic read shields and connected to a preamplifier, wherein the preamplifier is configured for providing a first biasing voltage level to the spin torque oscillator (STO) and to the head-disk interference (HDI) sensor, and wherein the preamplifier is configured for determining a resistance change in the head-disk interference (HDI) sensor;
wherein the spin torque oscillator (STO) and the head-disk interference (HDI) sensor are coupled to a first connector of the trace such that a first terminal of the spin torque oscillator (STO) and the head-disk interference (HDI) sensor receive a first polarity of the first biasing voltage level and coupled to a second connector of the trace such that a second terminal of the spin torque oscillator (STO) and the head-disk interference (HDI) sensor receive a second polarity of the first biasing voltage level.

8. The arm-head assembly of claim 7 wherein the first terminal of the head-disk interference (HDI) sensor is connected to a first terminal of a first resistor and a second terminal of the first resistor is connected to the first connector of the trace, wherein the second terminal of the head-disk interference (HDI) sensor is connected to a first terminal of a second resistor and a second terminal of the second resistor is connected to the second connector of the trace.

9. The arm-head assembly of claim 8 wherein the first terminal of the spin torque oscillator (STO) is connected to a first terminal of a third resistor and a second terminal of the third resistor is connected to the first connector of the trace, wherein the second terminal of the spin torque oscillator (STO) is connected to a first terminal of a fourth resistor and a second terminal of the fourth resistor is connected to the second connector of the trace.

10. The arm-head assembly of claim 9 wherein a first terminal of a fifth resistor is connected to the second terminals of the first and third resistors and the first connector of the trace, a first terminal of a sixth resistor is connected to the second terminals of the second and fourth resistors and the second connector of the trace, and a second terminal of each of the fifth and sixth resistors are connected to a ground reference terminal.

11. The arm-head assembly of claim 10 wherein the first, second, third, fourth, fifth, and sixth resistors are selected to balance out bias voltage requirements of the spin torque oscillator (STO) and the head-disk interference (HDI) sensor and deliver a desired voltage to the spin torque oscillator (STO) and the head-disk interference (HDI) sensor.

12. The arm-head assembly of claim 7 wherein the first terminal of the spin torque oscillator (STO) and the first terminal of the head-disk interference (HDI) sensor are connected to the first connector of the trace and the second terminal of the spin torque oscillator (STO) and the second terminal of the head-disk interference (HDI) sensor are connected to the second connector of the trace to couple the spin torque oscillator (STO) and the head-disk interference (HDI) sensor in parallel.

13. A head assembly comprising:
a microwave assisted magnetic recording (MAMR) element comprising:
a spin torque oscillator (STO) situated between a main pole and a trailing shield of a write head and connected to a voltage for developing a current that flows through the STO; and
a head-disk interference (HDI) sensor placed between the trailing shield and a magnetic read shield and connected to a trace and connected to a preamplifier, wherein the preamplifier is configured for providing a first biasing voltage level to the STO to induce a magnetization change in the STO and in the write head within the head assembly and to the HDI sensor to heat the HDI sensor, and wherein the preamplifier is configured to determine a resistance change in the HDI sensor;
wherein the STO and the HDI sensor are coupled to a first connector of the trace such that a first terminal of the STO and the HDI sensor receive a first polarity of the first biasing voltage level and coupled to a second connector of the trace such that a second terminal of the STO and the HDI sensor receive a second polarity of the first biasing voltage level.

14. The head assembly of claim 13 wherein the first terminal of the HDI sensor is connected to a first terminal of a first resistor and a second terminal of the first resistor is connected to the first connector of the trace, wherein the second terminal of the HDI sensor is connected to a first terminal of a second resistor and a second terminal of the second resistor is connected to the second connector of the trace.

15. The head assembly of claim 14 wherein the first terminal of the STO is connected to a first terminal of a third resistor and a second terminal of the third resistor is connected to the first connector of the trace, wherein the second terminal of the STO is connected to a first terminal of a fourth resistor and a second terminal of the fourth resistor is connected to the second connector of the trace.

16. The head assembly of claim 15 wherein a first terminal of a fifth resistor is connected to the second terminals of the first and third resistors and the first connector of the trace, a first terminal of a sixth resistor is connected to the second terminals of the second and fourth resistors and the second connector of the trace, and a second terminal of each of the fifth and sixth resistors are connected to a ground reference terminal.

17. The head assembly of claim 16 wherein the first, second, third, fourth, fifth, and sixth resistors are selected to balance out bias voltage requirements of the MAMR element and the HDI sensor and deliver a desired voltage to the STO and the HDI sensor.

18. The head assembly of claim 17 wherein the first terminal of the spin torque oscillator (STO) and the first terminal of the head-disk interference (HDI) sensor are connected to the first connector of the trace and the second terminal of the spin torque oscillator (STO) and the second terminal of the head-disk interference (HDI) sensor are connected to the second connector of the trace to couple the spin torque oscillator (STO) and the head-disk interference (HDI) sensor in parallel.

19. A method for fabricating a head assembly comprising the steps of:
forming a read head by the steps of:
constructing and configuring a read sensor, and
constructing and configuring a pair of magnetic read shields;
forming a write head by the steps of:
constructing and configuring a main pole, and constructing and placing a trailing shield adjacent to the main pole;

forming and situating a spin torque oscillator (STO) between the main pole and the trailing shield;

connecting the spin torque oscillator (STO) to a voltage for developing a current that flows through the spin torque oscillator (STO) for generating a microwave voltage field that impinges on a region of a hard disk in close proximity to the main pole to lower the coercivity of the region of the hard disk beneath the spin torque oscillator (STO) for allowing higher density recording; and forming and placing a head-disk interference (HDI) sensor between the trailing shield and one of the magnetic read shields and connected to a trace connected between a preamplifier and the read and write heads, wherein the preamplifier is configured for providing a first biasing voltage level to the spin torque oscillator (STO) and to the head-disk interference (HDI) sensor to induce a magnetization change in the STO and in the write head and to the HDI sensor to heat the HDI sensor, the preamplifier is configured for determining a resistance change in the head-disk interference (HDI) sensor;

wherein the spin torque oscillator (STO) and the head-disk interference (HDI) sensor are coupled to a first connector of the trace such that a first terminal of the spin torque oscillator (STO) and the head-disk interference (HDI) sensor receive a first polarity of the first biasing voltage level and coupled to a second connector of the trace such that a second terminal of the spin torque oscillator (STO) and the head-disk interference (HDI) sensor receive a second polarity of the first biasing voltage level.

20. The method for fabricating a head assembly of claim 19 further comprising the steps of:

connecting the first terminal of the head-disk interference (HDI) sensor to a first terminal of a first resistor;

connecting a second terminal of the first resistor to the first connector of the trace;

connecting the second terminal of the head-disk interference (HDI) sensor to a first terminal of a second resistor; and connecting a second terminal of the second resistor to the second connector of the trace.

21. The method for fabricating a head assembly of claim 20 further comprising the steps of:

connecting the first terminal of the spin torque oscillator (STO) to a first terminal of a third resistor;

connecting a second terminal of the third resistor to the first connector of the trace;

connecting the second terminal of the spin torque oscillator (STO) to a first terminal of a fourth resistor; and connecting a second terminal of the fourth resistor to the second connector of the trace.

22. The method for fabricating a head assembly of claim 21 further comprising the steps of:

connecting a first terminal of a fifth resistor to the second terminals of the first and third resistors and the first connector of the trace; and connecting a first terminal of a sixth resistor to the second terminals of the second and fourth resistors and the second connector of the trace; and connecting a second terminal of each of the fifth and sixth resistors to a ground reference terminal.

23. The method for fabricating a head assembly of claim 22 further comprising the steps of:

selecting the first, second, third, fourth, fifth, and sixth resistors for balancing out bias voltage requirements of the spin torque oscillator (STO) and the head-disk interference (HDI) sensor; and delivering a desired voltage to the spin torque oscillator (STO) and the head-disk interference (HDI) sensor.

24. The method for fabricating a write head assembly of claim 23 further comprising the steps of:

connecting the first terminal of the spin torque oscillator (STO) and the first terminal of the head-disk interference (HDI) sensor to the first connector of the trace; and connecting the second terminal of the spin torque oscillator (STO) and the second terminal of the head-disk interference (HDI) sensor to the second connector of the trace to couple the spin torque oscillator (STO) and the head-disk interference (HDI) sensor in parallel.

* * * * *